United States Patent [19]

van der Lely et al.

[11] Patent Number: 5,195,455
[45] Date of Patent: Mar. 23, 1993

[54] ARRANGEMENT FOR KEEPING DAIRY ANIMALS CLEAN

[75] Inventors: Ary van der Lely, Maasland; Cornelis van der Lely, Zug; Cornelis J. G. Bom, Rozenburg; Karel van den Berg, Bleskensgraaf, all of Netherlands

[73] Assignee: C. van der Lely N.V., Maasland, Netherlands

[21] Appl. No.: 774,166

[22] Filed: Oct. 15, 1991

Related U.S. Application Data

[63] Continuation of Ser. No. 482,520, Feb. 21, 1990, abandoned.

[30] Foreign Application Priority Data

Feb. 21, 1989 [NL] Netherlands ........................... 8900415
Feb. 21, 1989 [NL] Netherlands ........................... 8900416

[51] Int. Cl.$^5$ ............................ A01K 1/01; A01K 1/12
[52] U.S. Cl. ................................ 119/14.03; 119/51.02; 119/163
[58] Field of Search ............... 119/14.01, 14.02, 14.03, 119/14.04, 174, 27, 28, 29, 51.02, 163, 161

[56] References Cited

U.S. PATENT DOCUMENTS

| | | | |
|---|---|---|---|
| 3,792,686 | 2/1974 | Needham et al. | 119/14.03 |
| 3,827,403 | 8/1974 | Meyer | 119/29 |
| 4,508,058 | 4/1985 | Jakobson et al. | 119/14.04 |
| 4,660,506 | 4/1987 | Nalven | 119/163 |
| 4,729,342 | 3/1988 | Loctin | 119/163 |

FOREIGN PATENT DOCUMENTS

| | | | |
|---|---|---|---|
| 189954 | 8/1986 | European Pat. Off. | 119/14.03 |
| 2928930 | 2/1981 | Fed. Rep. of Germany | 119/14.03 |
| 2579415 | 10/1986 | France | 119/14.03 |
| 420289 | 8/1974 | U.S.S.R. | 119/14.04 |
| 649373 | 2/1979 | U.S.S.R. | 119/14.04 |
| 1030774 | 5/1966 | United Kingdom | 119/14.04 |

*Primary Examiner*—John G. Weiss
*Attorney, Agent, or Firm*—Penrose Lucas Albright

[57] ABSTRACT

A device for maintaining dairy animals and surface areas where they may be confined in a clean condition, and providing a station for feeding, milking and elimination of wastes which is movable as a unit. The station has a waste disposal at the rear and a feeder forward. An electronic system causes an animal to enter the station prior to waste elimination. A sensor determines the presence of animal waste. An electronic system that remotely guides the animal, comprises a radio transmitter at the station, a radio receiver mounted on the animal to guide the animal by shock or sounds to the station and/or sounds produced at the station attract the animal. A sensor on the animal's tail that signals the onset of elimination or presence of waste, may be coupled to the station's electronic system, or to a speaker near the animal's ear for producing unpleasant sounds to discourage elimination outside the station. Electronic systems are used to reward the animal after its elimination in the station. The station comprises devices to clean the animal's udders and substantially simultaneously to flush the animal's droppings from a grating into a waste disposal area, and to milk the animals subsequent to cleaning. After the animal's elimination and other processes are complete, the station is opened at its forward end and the animal is induced to leave.

33 Claims, 3 Drawing Sheets

Fig. 1

ARRANGEMENT FOR KEEPING DAIRY ANIMALS CLEAN

RELATED APPLICATIONS this is a continuation of application of application Ser. No. 07/482,520, filed Feb. 21, 1990, now abandoned.

FIELD OF THE INVENTION

The invention relates to an arrangement for keeping dairy animals clean, such as dairy cows, which involves an accommodation for the animals. Arrangements of this type are known in the form of a closed or open loose house or a meadow.

BACKGROUND OF THE INVENTION

Such accommodations have the serious disadvantage that dairy animals deposit their droppings in randomly chosen places. When the animal lies down, it is, in particular, the udder that is contaminated, so that it is necessary, at least before the animal is milked, that the udder of each animal be cleaned manually. In addition, other parts of the animal are soiled as well and thus must also be cleaned. Moreover, because the droppings get mixed with the straw spread on the floor and with urine, they contaminate the stable floor to a significant extent. The cleaning of the stable, too, is a laborious, highly time-consuming and hence an expensive operation.

SUMMARY OF THE INVENTION

An object of the invention is to improve these prior art arrangements. According to the invention, the improvement comprises the provision of means, such as includes feeding equipment, that is located near an area where it is desired that a dairy animal should deposit its droppings. The means provided are of a character and structure to encourage the animal to deposit its droppings in the desired area. More specifically, the depositing area comprises essentially a lavatory system constructed as a unit.

The invention is of significance not only for dairy cows, but also for other animals which, preferably, should remain clean.

As regards dairy cows, the following factors should be taken into account to provide hygienic conditions and improved milk yields:

a. That the dairy animals should be maintained in an optimally clean condition to prevent bacteria contained in their droppings from finding its way into milk intended for human consumption;

b. That the dairy animal should be able to lie down comfortably on a clean insulating layer, e.g. clean and dry straw, so that it will be able to produce a maximum quantity of milk in warm and favorable conditions even during periods of cold;

c. That the dairy animals should be able to move about in an accommodation, e.g. an open or closed loose house or a meadow, so that their blood circulation and milk yield are improved.

In accordance with a feature of the invention, the manure depositing area comprises means to confine and retain an animal temporarily therein. The means to conform and retain an animal temporarily in the depositing area may comprise electrically or electronically controlled locking means. In a special embodiment according to the invention, the locking means comprises rods, at least one of which is adjustable, and which rods can be positioned at both sides of the neck of an animal.

In another embodiment according to the invention, the locking means include at least one door which forms part of the further surrounded depositing area. In both embodiments, the confining and retaining means may include a control member to release the locking means after the droppings have been deposited.

In accordance with a further feature of the invention, the depositing area is provided with a grating which is arranged in the floor and near the rear side of an animal therein. Specifically, the arrangement may include cleaning means, to wash down the depositing area and the grating in particular.

In accordance with a yet further feature of the invention, the depositing area is provided with means preferably electronic means, to determine whether or not an animal has deposited its droppings. In a first embodiment, the electronic means may include at least one sensor attached to a rod of a grating in the floor and near the rear side of the animal retained in the depositing area. In a second embodiment, the electronic means include a sensor, preferably an infrared one, attached in a collector element or gutter for collecting droppings, said collector element or gutter being placed under a grating in the floor and near the rear side of the animal confined within the depositing area. In the latter embodiment, it is a great advantage that ammonia binding material supply means is provided to supply ammonia binding material in the collector element or gutter after the droppings have been deposited. In both embodiments, the electronic means may include a control system which, by energizing the feeding equipment, offers fodder as a reward after the animal has deposited its droppings.

In accordance with a still further feature of the invention, the depositing area includes a washing station for an animal. This washing station is preferably arranged near the rear side of an animal in the depositing area.

According to the invention, the depositing area may furthermore include a milking apparatus.

In accordance with another feature of the invention, the depositing area includes a sound system. In a special embodiment, this sound system may comprise means for producing squeaking sounds or sounds which imitate the sounds of falling fodder or falling water.

Also according to the invention, the depositing area may be a mobile one.

In accordance with still another feature of the invention, the encouraging means, which are, as mentioned before, the means which are attached near the area where a dairy animal should deposit its droppings and which are of such that the animal is encouraged to deposit its droppings in the arrangement, may include a clock and, connected thereto, a member for generating electrical signals. In a special embodiment, the encouraging means include a loudspeaker attached to the animal. In another embodiment, the encouraging means include a call system having a loudspeaker attached to the depositing area, which loudspeaker is connected to a system for producing sounds which are agreeable to the animal.

In accordance with a yet further feature of the invention, discouraging means are provided, which means are attached to the dairy animal or are positioned in the accommodation. Such discouraging means are of such character that the animal is discouraged from depositing its droppings in an area other than the depositing area. Thus, the invention also relates to an arrangement for keeping dairy animals clean such as dairy cows, which arrangement is provided with an accommodation for the animals, characterized in that the arrangement comprises means which are attached to the dairy animal or are positioned in the accommodation, such means comprising a construction and arrangement so that the animal is discouraged from depositing its droppings in an area other than the depositing area. In a special embodiment, the discouraging means include one or more loudspeakers. Furthermore, a mechanism for producing sounds which are disagreeable to the animal may be coupled to a loudspeaker attached to the animal.

In accordance with a still further feature of the invention, part of the arrangement may include a flexible tube which is fitted around the animal's tail. In part it comprises one or more sensors or contacts which touch each other upon deformation of the tube. In that case a mechanism may be mounted on the animal, which, when the contacts close, produces near the animal's head a sound disagreeable to the animal. In this connection and in accordance with a further feature of the invention, the sensors may respond when they contact droppings or urine or both. In such event, the sensors may be located on the tube and produce sounds disagreeable to the animal near the animal's head.

Further, in accordance with the invention, directional means may be provided which are secured on the animal, as well as elements which produce low intensity electric shocks, which although unpleasant, do not harm the animal, the arrangement being such that, after having received a given signal at its left-hand side, at its right-hand side or at neither side, the animal commences to move in a predetermined direction. Thus, the invention also relates to an arrangement that maintain dairy animals clean, such as dairy cows in a clean, hygienic condition, which arrangement comprises an accommodation for the animals where they can move about, wherein means for causing the animals to move in predetermined direction are secured to the animals, as well as components which produce low intensity shocks which are received by the animals. The arrangement is that, after having received a signal such as an electric shock on its left-hand side, or on its right-hand side or neither side, the animal commences to move in a predetermined direction. In a special embodiment, the directional means may include a compass or a radio system.

Although the components mounted on the animal may generate shocks of an electric nature, other stimuli producing apparatus may be employed. Such apparatus may be mounted on both sides of the animal. In a special embodiment of the invention, a signal from the animal's rear side is generated when the animal wants to deposit its droppings. Stimuli can then be applied in such a manner that the animal is induced to move towards the depositing area.

In accordance with a still further feature of the invention, the animal wears an identification collar which co-operates with electronic means to identify specific animals. These electronic means co-operates with a sensor or sensors mounted to determine which animals have not deposited droppings in the depositing area. Part of the electronic means includes a direction-finding component which includes a radio transmitter system.

As previously indicated, in accordance with the invention, the accommodation for the animals can be an open loose house, a closed loose house or a meadow.

Between the accommodation and a manure or dung storage space, at least one depositing area is located where an animal should deposit its droppings. More specifically, the depositing area includes a lavatory system.

The inventive concept involves the training and encouragement of the animals to deposit their droppings in a predetermined area, basically a lavatory system, a number of technical means being applied to accomplish this purpose. The droppings so received from the animals are discharged directly and automatically from the lavatory system to the dung storage space, to reduce contamination of the accommodation to the point that it is negligible. The lavatory system, in which the droppings are deposited, is also utilized as a washing station for the udders, as a feeding station and as a milking parlor for automatically or otherwise milking each animal present in the lavatory.

In accordance with a feature of the invention, one such depositing area is provided for an accommodation intended for approximately forty animals.

In accordance with a further feature of the invention, the depositing area is flushed with water. In accordance with another feature of the invention, the depositing area may include a feeding system or a washing station or both for animals. In the latter case, the washing station may be arranged near the rear of the animal confined in the depositing area. Also, in accordance with the invention, the depositing area may include a milking apparatus.

The invention yet further relates to a milking parlor for milking dairy animals, such as dairy cows in particular, which milking parlor is provided with an area for milking the animals, characterized in that the milking parlor is mobile as a unit and comprises a washing station for cleaning parts of the animals. The milking parlor may include as a component part thereof a system for discharging the droppings of an animal therein. The milking area may be provided with a grating located at the rear of an animal therein. The milking area may be characterized in that it is provided with one or more sensors for establishing whether or not the animal has deposited its droppings therein. The sensor may be attached to the grid for this purpose. The milking area may be provided with one or more heads to spray jets of water which are preferably arranged near the rear of an animal therein. Means may be provided to activate these water heads when the sensor is energized.

In accordance with the invention, the milking parlor is equipped with means for encouraging the animal to deposit its droppings in a receptacle arranged at or near the milking area. Thus, the invention relates to a milking parlor for milking dairy animals, such as dairy cows, characterized in that it has components that encourage the animal to deposit its droppings in a receptacle which is part of or at least near the milking parlor. This receptacle may be connected to a space for dung storage. Furthermore, a fodder dosing device may be provided which delivers fodder to the animal as a reward when a sensor that determines that the animal has deposited its droppings energizes that dosing device. The invention is also directed to a milking parlor for milking dairy animals, such as dairy cows, that defines an area for the dairy animals where these animals can be milked, characterized in that the milking parlor comprises in combination: a frame with a floor and tubular walls, a washing system for cleaning parts of an animal, particularly the udder, and an automatic milking device.

The invention moreover involves a feeding station for feeding dairy animals, such as dairy cows in particular, characterized in that the feeding station has an area where dairy animals should deposit their droppings and within the feeding station, means may be provided to retain an animal temporarily therein. The feeding station may further be provided with a mechanism for discharging the deposited dung as well as to wash the animal therein. The feeding station may furthermore include a milking apparatus, specifically an apparatus for automatically milking dairy animals.

For a better understanding of the invention and to show how the same may be carried into effect, reference will now be made, by way of example, to the accompanying drawings, in which:

DESCRIPTION OF THE PREFERRED EMBODIMENTS

Figure 1:
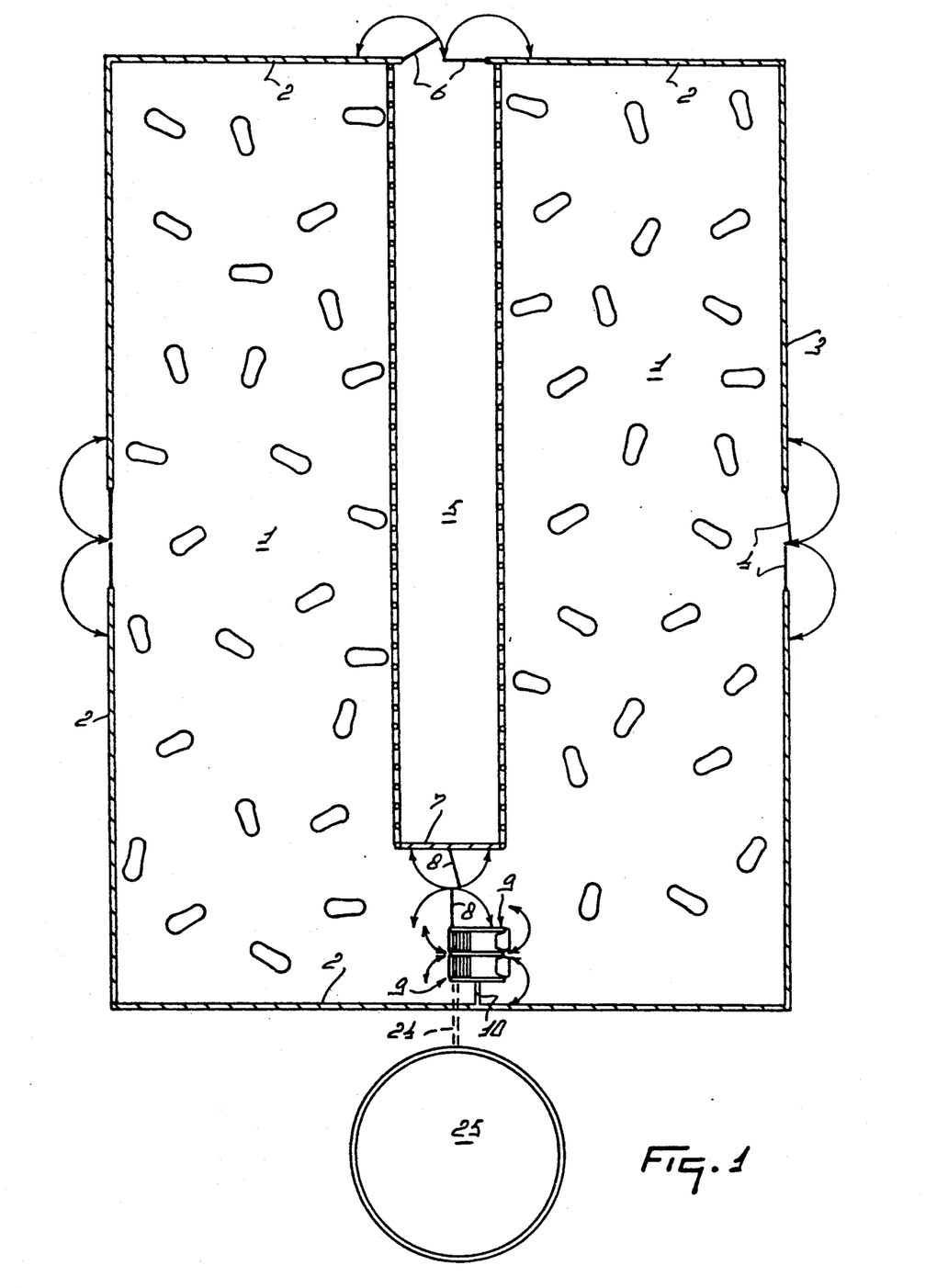
FIG. 1 is a plan view of a stable in which the invention is applied.

The plan view of FIG. 1 discloses a stable or accommodation for dairy animals, i.e. animals whose milk is used for human consumption, e.g. dairy cows. The accommodation or room is denoted, in general, by reference numeral 1 and is enclosed completely or partly by a number of walls 2 and 3 and a roof (not shown). In this embodiment, wall 3 includes a pair of doors 4, through which the animals are brought into accommodation 1 or outside into the open air. In this case, accommodation 1 is a closed loose house wherein the animals are permitted to move about freely. However, the invention may also relate to an open loose house, in which e.g. wall 3 is eliminated, so that the animals can move freely in and out from a passageway located next to the stable. In the embodiment shown, central to the smallest dimension of stable 1 there is arranged a feeding passage 5 which extends parallel to and through the greater part of the longest dimension of the stable, such feeding passage 5 being separated from the room 1 located on either side thereof by vertical bars or the like, through which the animals can pass their heads to obtain fodder therefrom. Feeding passage 5 is accessible from the outside via stable doors 6. The feeding passage end remote from stable doors 6 is constituted by a wall 7 of equal width as the feeding passage. Two low hinging doors 8 are contiguous to the center of wall 7, which doors can be opened by the animals themselves, so that they can freely move from one room 1 into the other. The droppings depositing areas or lavatory systems 9 are contiguous to the boundary of hinging doors 8 that is remote from the feeding passage 5, the longest dimension of each of these depositing areas extending in this embodiment parallel to the shortest bounding wall 2 of the stable. Between the boundary of depositing area 9, remote from feeding passage 5 and closest to a bounding wall 2, on one side and this bounding wall 2 on the other side a clearance is provided. This clearance is bridged by a short wall 10, the length of which is approximately equal to the width of each of depositing areas 9.

In prior art accommodations or stables of the type shown in FIG. 1 (however, with the exception of the droppings depositing areas 9 which, as will be described in greater detail hereinafter, form part of the invention), in which the dairy cows can walk around freely, the floor is preferably provided with an insulating covering layer, e.g., a layer of straw. The cows can lie down and rest on this layer of straw. Because the animals can walk about freely, their droppings are deposited randomly in the stable, which causes considerable contamination thereof. It may happen that a cow lies down on the excrements (i.e. the more or less solid droppings and the urine), so that in particular the cow's udder is thus contaminated. Inasmuch as the cows are to be milked, at least this portion of each cow must be cleaned manually; if each udder is to be cleaned very thoroughly, the length of time required therefor is quite considerable, partly because of the fact that the quantity of clean water required for each animal individually is not directly available in a loose house. Moreover, this water runs from or drips off of the udder and is spread more or less at random through the loose house, which still further increases contamination of the stable, especially when dung is removed by such water from the cow's udder. These problems combine to make milking and cleaning of the stable a laborious and time-consuming operation.

For a hygienic and advantageous milk production it is desirable that:

a. dairy animals should be maintained optimally clean to prevent bacteria contained in their droppings from reaching the milk intended for human consumption;

b. the dairy animal can lie down comfortably on an insulating layer of e.g. dry and clean straw, so that it will be able to produce a maximum quantity of milk in warm and under favorable conditions even during periods of cold; and c. the dairy animals can move about in their accommodation, e.g., an open stable or a meadow, so that their blood circulation and milk yield are promoted.

To obviate the above-mentioned disadvantages and to satisfy said hygienic and other conditions for an appropriate milk yield, the accommodation of the animals (the loose house, as shown or a meadow) is provided with at least one droppings depositing area or lavatory system, which in FIG. 1 is denoted in general by reference numeral 9.

Figure 2:
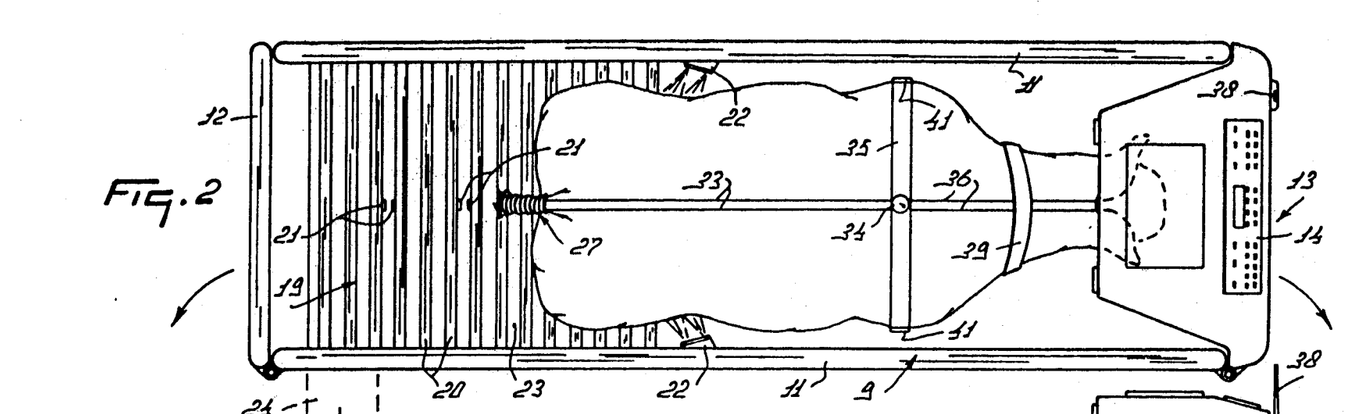
FIG. 2 is a plan view of a dung depositing area or lavatory system in accordance with the invention.
Figures 4, 5:
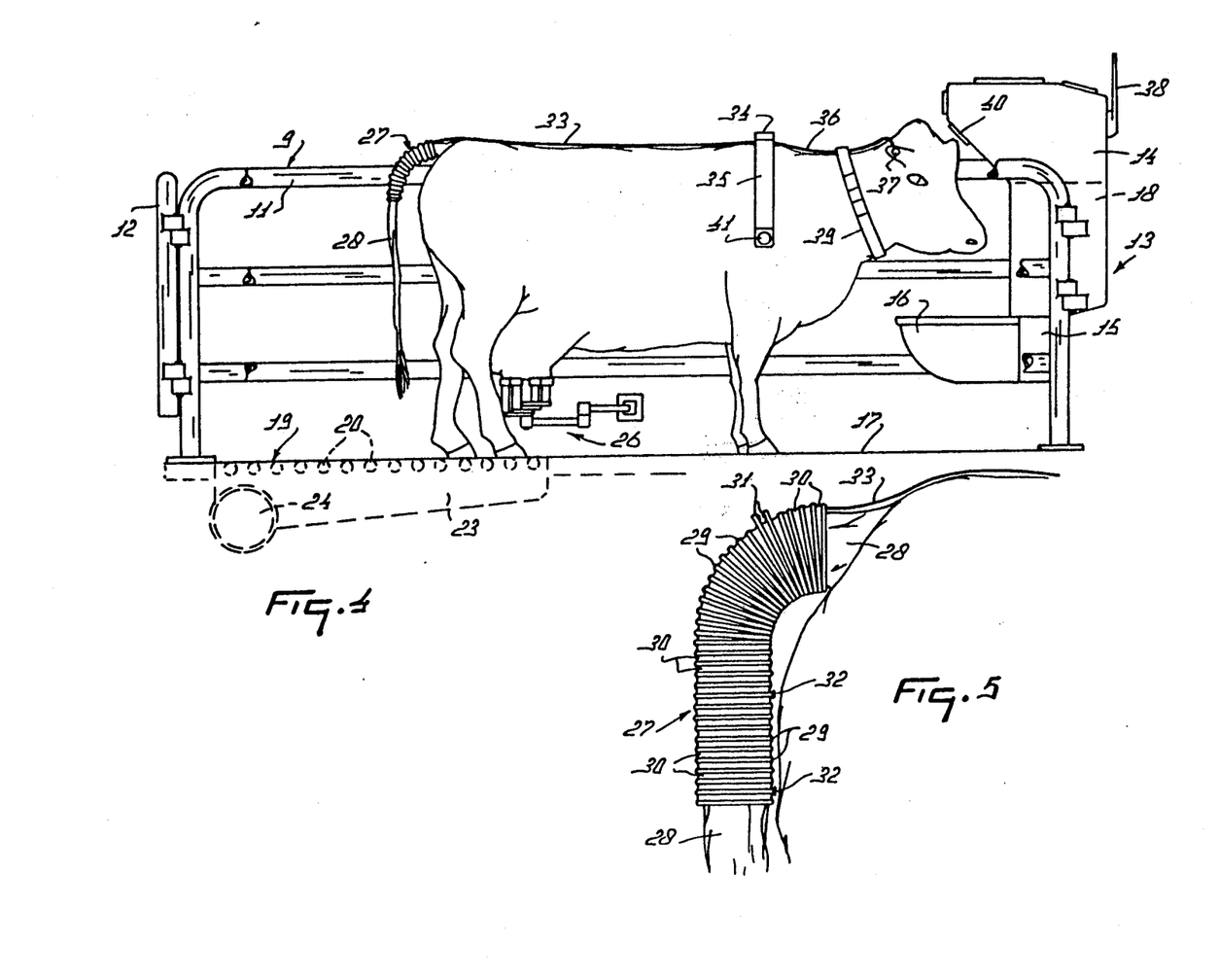
FIG. 4 is a side view of the depositing area or lavatory system as shown in FIG. 2, which lavatory is also used as a milking parlor.
FIG. 5 shows, seen in side view, means attached to an animal for inducing same to deposit its droppings in a lavatory system.

Each depositing area 9 as shown in the embodiment of FIGS. 2 and 4 is bounded by its two longitudinal sides by a railing 11 or other appropriate confinement means, two of such railings 11 being arranged parallel to each other and spaced apart by a distant that slightly exceeds the width of the type of dairy animal for whom system 9 is intended. Depositing area 9 has an entrance which is closable by means of a door 12 and, at its other end, an exit which is closable by means of a further door 13. The two doors 12 and 13 are hingeable about associated vertical hinges which are connected to one of the lateral bounds of the depositing area; the doors are hingeable in directions indicated by arrows in FIG. 1. Entrance doors 12 are movable through an arc of approximate 90° and the exit doors 13 through an arc of 180°.

Entrance door 12 is a flat door which can be made of any desired material. But exit door 13 includes several mechanisms that play an important part in the implementation of the inventive concepts. The upper part of door 13 comprises a compartment of housing accommodating a partly electronic, partly electrical installation 14, and also, near the bottom side of the housing for installation 14, a feeding system 15 for filling a trough 16 which is within the reach of an animal present in deposition area 9. Trough 16 is arranged above a floor 17 of depositing area 9 at a height advantageous for the animal. Feeding system 15 effects the supply of relatively small quantities of fodder which is very tasty for the relevant type of dairy animal. Trough 16 is filled from a fodder storage container 18. Container 18 is accommodated in a continuation of the housing for the electrical installation 14, but is of course separated from said installation by a tight partition.

The longest dimension of the space within the depositing area 9, that is, its length exceeds the length of any full-grown dairy animal expected to be received in depositing area 9 by approximately twenty to forty percent.

Doors 12 and 13 function as locking means for depositing area 9. These locking means can be controlled electrically or electronically. In general, they form means to confine and retain an animal temporarily in the depositing area. As an alternative, the locking means may include rods, at least one of which is adjustable; these rods can be positioned at both sides of the neck of an animal to restrain the animal in a practically fixed position in depositing area 9. The retaining means also includes a control member to release the locking means after the animal's droppings have been deposited.

Near the rear end of an animal present in depositing area 9, floor 17 is structured as a grating or grid floor 19 in the form of a plurality of bars or rods 20 extending transversely to the longitudinal direction or length of depositing area 9 which are constructed to allow droppings of an animal in area 9 to pass through grating 19. Preferably, near grating 19 cleaning means are installed to rinse depositing area 9 and, in particular, grating 19. Furthermore, depositing area 9 is provided with means, preferably electronic means, to sense whether or not an animal therein has deposited its droppings. At least two adjacent, parallel rods 20 are provided them with sensors or contacts 21. The sensors or contacts 21, provided in pairs, are so arranged against adjacent rods 20 that they face each other, and are connected to the associated rods in a position located below the upper sides thereof. Sensors 21 are connected via cables (not shown) to the electronic installation 14 near the forward part of the animal in depositing area 9.

As an alternative, the electronic means to determine whether or not an animal has deposited its droppings or not may include another type of sensor, preferably an infrared one, attached in a collector element or gutter for collecting droppings. This collector element or gutter is located under grating 19. In this alternative arrangement, it is of great advantage that ammonia binding material supply means may be provided to supply an ammonia binding material into the collector element or gutter after the droppings have been deposited. Such ammonia binding material is commercially available; the use of this material is highly recommended and most important from an ecological viewpoint.

Figure 3:
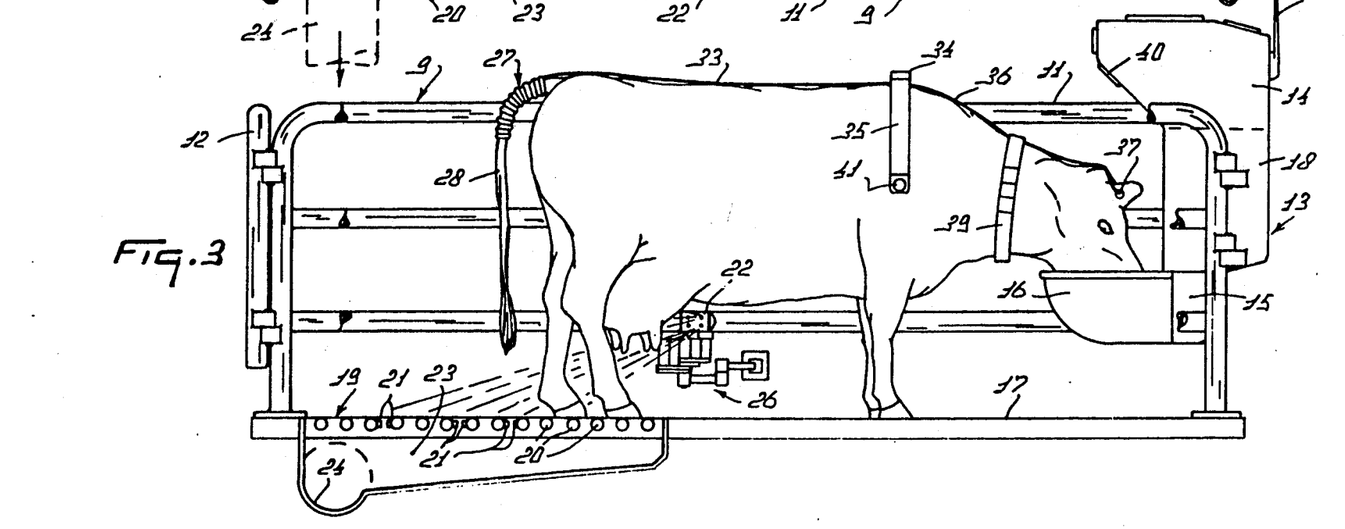
FIG. 3 is a side view of the depositing area or lavatory system, which lavatory is also used as a feeding station.

As is apparent from FIGS. 2 and 3, against each of the lateral railing's 11 a washing system 22 is installed preferably in the form of sprinklers or showers. Seen in the side view of FIG. 3, each washing system 22 is located at the level of the udder of an animal in the depositing area or, considered in the direction of exit door 13, at a short distance forward of where the udder is located. The washing system 22 is arranged so that water discharged therefrom during operation of this system is directed obliquely rearwardly towards the udder and at the same time towards grating 19.

Below grating 19 a collecting bin 23 is provided for collecting the droppings and the water discharged from the washing system 22.

Bin 23 is formed with a sloping bottom, so that the droppings and water from system 22 are discharged into a discharge pipe 24, which pipe is received through or under the nearby wall 2 and terminates in a dung pit or slurry pit 25 arranged in the ground. Pit 25 is accessible from above to allow the collected dung to be pumped into e.g. a slurry tank or similar drivable dung container.

Consequently, a lavatory system 9 is conveniently placed between accommodation 1 and dung storage space 25.

As is apparent from FIG. 4, depositing area 9 may also be provided with an automatic milker 26, which is connected pivotally to one of the railings 11 of depositing area 9 and is operated by electronic installations 14 so that it is connected automatically to the teats of the udder of an animal present in depositing area 9, the milk being conveyed to a bulk milk tank (not shown). Alternatively, depositing area 9 may be provided with a milker wherein the teat cups are applied manually to the teats of the udder of the animal in depositing area 9.

It will, accordingly, be appreciated that depositing area 9 is arranged so that a dairy animal therein is induced to, and should, deposit its droppings which are received therein and discharged therefrom, and so that it functions as a washing station to clean at least the animal's udder and otherwise to keep the animal clean, as a milking parlor for, via an automatically or manually installed milker to milk an animal therein, and as a feeding station for feeding this animal. The depositing area for the deposition of droppings, in combination with the washing system, constitutes a lavatory system which can be used sequentially by several animals present in the accommodation 1.

A feature of this invention is to discourage animals present in accommodation 1 to deposit their droppings there inside (i.e. outside the lavatory system 9), or to induce them to deposit their droppings in the depositing area or lavatory system, or both. This can be achieved by different means, inter alia, by luring the animals to depositing area 9.

A method of discouraging an animal present in the accommodation 1 from discharging its droppings then and there includes the application of a suitable device to the animal itself. This device comprises a flexible tube designated generally by reference numeral 27 arranged around the tail 28 of each of the animals (See FIG. 5). Flexible tube 27 is pushed as far as possible to the upper side of tail 28 and has a sufficient length so that, when the animal lets its tail hang, it extends in a downward direction to below the position where the droppings leave the animal. Tube 27 is provided with a plurality of relatively stiff rings or ribs 29 which are relatively closely interspaced and are interconnected to relatively thin, flexible connection members 30 which, in the stretched position of the tube, are in the form of short cylinders and on both sides and all around are contiguous to rings 29. At a short distance from the upper end of tube 27 fitted around the tail 29, two adjacent rings 29 facing sensors or contacts 31 are applied. Sensors 31 are provided on the farthest outwardly and upwardly located portions of the two adjacent rings 29, when the tail is in the position as shown in FIG. 5. On the lower end of tube 27, taken in the downward position of tail 28 shown in FIG. 5, sensors 32 are applied on one, or on a plurality, of rings 29, i.e. in a location at the periphery of a ring 29 which, in the position shown in the drawing, is directed towards the cow's body, but below the position where the excrements leave the body. By means of the thin, flexible electrical connection wires 33, shown in FIGS. 2 to 4, which are passed along the upper side of the animal to the front and are secured to the animal's body, the sensors 31 and 32 are connected to a member 34 (FIG. 2) which is arranged on the highest point of a belt 35 hung in the transverse direction on the animal's body. From member 34, further connecting wires 36 are received over and secured to the upper side of the body and the neck of the animal, which wires terminate in small loudspeakers 37 (FIGS. 3 and 4) which are attached to or near the animal's ears on its head.

Member 34 includes a small battery or an other type of energy source and a compact electronic circuit, a portion of which is designed as a simple radio signal receiver.

If, in accordance with a first method of discouraging the animal to deposit its droppings in the accommodation 1, the animal moves its tail upwards, the flexible tube 27 is stretched, so that contacts 31 touch each other. This causes a signal to be conveyed to member 34 via connecting wires 33, whereby the circuit accommodated in member 34 is energized and via connection wires 36, loudspeakers 37 produce a sound which is unpleasant to the animal (e.g. a squeaking or whistling sound), which reaches the animal's ears via loudspeakers 37. When an animal, which is in the accommodation 1 for the first time and has been provided with the means described in the foregoing, has experienced this unpleasant effect for a number of times, has observed where other animals accustomed to stay in the accommodation deposit their droppings and has been guided one or several times to the depositing area by a person present, it knows in which direction to go when the disagreeable sound is received. Especially when the animal is aware that the unpleasant sound will disappear in the depositing area, after some experience it will go without any further incentives to the depositions area with the object of depositing its droppings there.

As soon as the animal enters depositing area 9, it comes within the range of the signal transmitted by a radio transmitter present in the electronic installation 14 of depositing area 9 (aerial 38 in FIGS. 2 to 4). The signal transmitted by this radio apparatus via the aerial 38 is comparatively weak and is radiated substantially within the confines of depositing area 9. The receiver inside member 34 provided on the animal includes an AND-gate which is controlled by this radio signal, the bias of which has been adjusted to a threshold value whereby it does not change state until after the animal has entered depositing area 9. The switched AND-gate now interrupts the squeaking or whistling sound produced by member 34, which sound was initiated by closing contacts 31. Thus, after some experience, animals in the accommodation 1, upon causing contacts 31 to close go to the depositing area 9, because they are aware that the disagreeable sound that they hear will disappear in that area. The animal encouraged thus to enter the depositing area 9 also learns that trough 16 is located there and that, if it deposits its droppings there, it will be offered a quantity of fodder.

When the animal, standing in depositing area 9, deposits its droppings on grating 19, these droppings electrically connect a pair of contacts 21 of grating 19, causing a signal to be transmitted to electronic apparatus 14 which energizes a control system forming part of apparatus 14, that in turn causes a dosed quantity of fodder to fall from storage container 18 into trough 16. After some experience, the animal will also learn that, if it fails to deposit its droppings on grating 19, trough 16 remain empty and exit door 13 remains closed.

Inside electronic system 14, the signal produced by sensors 21 to the passage of droppings can be combined with a signal derived from a cow identification collar 39 to record the fact that the relevant animal (a data broadcast from the collar 39) has indeed deposited its droppings on grating 19 of lavatory system 9. Thus, it can be established which animals remain insufficiently experienced to make proper use of depositing area 9.

After an animal has deposited its droppings on grating 19 in lavatory system 9 and the relevant signal has been transmitted by electronic system 14, not only fodder is conveyed to trough 16 but also, after a short period of time, determined by a clock or a time measuring system, washing device 22 is made operative, by means of which, preferably from two sides, the udder is cleaned by spraying it with preferably tepid or slightly warm washing water. The obliquely rearwardly and inwardly sprayed washing water is directed so that also the remnants of the droppings on grating are washed down into receptacle 23. After a further period of time, determined by the time measuring system, automatic milking implement 26 is pivoted inwardly towards the udder and is connected automatically to the teats, so that depositing area 9 also serves as a milking parlor.

Once the sequential washing and milking procedures have ended, electronic system 14, after the end of the milking procedure has been signalled, triggers a control system which causes door 13 to open through 180°, so that the animal can walk into accommodation 1.

It should be noted that a further attraction luring means can, be used by providing the system 14 with a loudspeaker 40 which, optionally, can produce continuously sounds that are agreeable to the animals and are audible in the entire accommodation 1.

Belt 35 (FIGS. 2 to 4), which hangs down across the back of the animals on both sides to approximately halfway along the animal's body is provided at its lowermost ends with an element 41 which is connected to the member 34 via electric connecting wires. The elements 41 are fitted with electrodes or the like, by means of which the animal can be subjected to slight electric shocks, similar to those provided by known cattle goads. These shocks require comparatively little energy. Elements 41 can receive an electric current from the energy source accommodated in the member 34. Taken in the longitudinal direction of the animal, a second belt may be arranged in a different position on the back, which belt is also provided with elements 41 to receive an electric current from an associated, further energy source.

Elements 41 constitute the basis for a further method of causing the animal to move towards the lavatory system 9. This method also includes a radio apparatus connected to depositing area 9 and transmitting comparatively strong signals into the accommodation 1. Member 34 may include a receiving system for the said last signals, which system is provided with detection means for detecting the direction from which the signals are received. As soon as the animal's tail moves upwardly and contacts 31 close, the signal supplied by these contacts renders the receiving system in the member operative, which causes element 41 to apply slight shocks to that side of the animal which is remote from the radio signal source (near the lavatory system 9). The animal experiences these shocks as unpleasant and is induced to move into the direction away from the shocks, so that is goes toward the radio signal, i.e. towards the lavatory system 9. When, for some reason or another, the animal might turn round, the elements 41 arranged at the other side of the animal will produce shocks, so that the animal is caused to move towards the lavatory system again. Thus, the animal's direction of movement is controlled. This goading implement is preferably arranged and controlled so that, when the animal moves in the proper direction, no shocks occur. After some experience, the animal automatically moves towards lavatory system 9 upon lifting its tail.

It is alternatively possible for belt 35 to be provided with a small, gimballed compass, in which the deflection of the compass needle is limited by contacts, by means of which, after activation by the contacts 31 and the compass needle, there are produced shocks at a side of the animal, thereby inducing the animal to move towards lavatory system 9. These goading systems, in accordance with the second method, may be combined with a sound source which produces sounds that are agreeable to the animals and which is attached to lavatory system 9.

In accordance with a further method, lavatory system 9 is provided with a call system which, after regular time intervals, produces sounds that are agreeable to the animals. These sounds may correspond to sounds which imitate the sound of fodder dropping in a trough or of falling water, which in latter case, thirsty animals are lured.

A further method of obviating contamination of the stable and of keeping the animals clean is performed by sensors 32 which, in response to the fact that the animal has lain down in droppings or in response to the droppings produced by the standing animal, activate member 34 and loudspeakers 37, as a result of which the animal will move towards lavatory system 9.

The aforementioned methods may, of course, be combined in part or as a whole, thereby either discouraging the animals to deposit their droppings inside accommodation 1 or encouraging them to deposit their droppings inside lavatory system 9, and/or forcing and/or attracting them towards lavatory system 9. After some habituation and experience, i.e. by observing the behavior of other animals or by having been guided towards lavatory system during the initial stage of their stay in accommodation 1, the animals adapt to certain automatic behavior of regularly utilizing the lavatory system by these methods, both separately and in combination. Once the animal has arrived in lavatory system 9, the sequence of actions and occurrences (depositing of droppings, recording with the aid of the cow identification collar, feeding, washing and milking) are performed in the order described. As soon as electronic system 14 receives the signal defining the end of the milking operation, it triggers the control system that opens door 13, while at the same time the loudspeaker 40 produces for a short period of time a disagreeable squeaking or whistling sound to induce the animal to leave lavatory system 9.

It should be noted that the inventive concept is not limited to the use of a depositing area or lavatory system 9 provided with the further described features in combination with an open or a closed loose house, but, alternatively, depositing area 9 may be of a movable structure, such as e.g. a depositing area 9 on wheels which are adjustable in height; the depositing area can be moved by a tractor to a predetermined location in a meadow. After the depositing area has been placed in position, the wheels on both sides thereof are moved upwardly, so that the floor of the depositing area is flush with the meadow level. The supply of energy of such a depositing area 9 positioned in a meadow can be effected by a power supply cable, or, alternatively, by means of a solar energy system in combination with batteries. At the location in the meadow where the depositing area 9 is placed, a dung pit can be dug with a passage to receive dung and wash water from grating 19.

Although we have disclosed the preferred embodiments of our invention, it is to be understood that it is capable of other adaptations and modifications within the scope of the following claims.

Having disclosed our invention, what we claim as new and to be secured by Letters Patent of the United States is:

1. A device for feeding animals, particularly dairy animals such as dairy cows, comprising means for receiving the droppings of the animals, the device being provided with food providing means which performs the function of providing food to the animal immediately after the animal has deposited its droppings in said receiving means.

2. A device as claimed in claim 1, which is arranged and constructed so that a plurality of animals can enter and leave the device one after the other, the device comprising food providing means for providing food to each of the animals to encourage them to deposit their droppings in said receiving means therefor.

3. A device as claimed in claim 1, comprising two gates, a first gate for an animal entering the device and a second gate for an animal leaving the device.

4. A device as claimed in claim 3, wherein said gates comprise electronically controlled securing means.

5. A device as claimed in claim 1, comprising a system of electronic means at least partly connected to the animals.

6. A device as claimed in claim 1, comprising electronic controlling means attached thereto.

7. A milking parlor for milking dairy animals such as dairy cows which comprises milking equipment means for displacing the milking parlor as a whole, a washing device for cleaning at least part of an animal in the parlor, and food dosing means which supplies food to the animal when the animal has deposited its droppings.

8. A feeding station for feeding several dairy animals such as dairy cows one after another which comprises a closet-type device in which an animal can deposit its droppings, and sensor means at the feeding station for detecting whether or not the animal has deposited its droppings.

9. A feeding station as claimed in claim 8, comprising food dosing means for supplying food to the animal when the animal has deposited its droppings.

10. A feeding station for feeding several dairy animals such as dairy cows one after the other which comprises a closet-type device having a depositing area which is intended to receive the droppings of animals therein, spray means mounted in said station laterally relative to said depositing area for directing a fluid spray towards said depositing area that impinges on said droppings and rinses said depositing area after receiving said droppings, and milking means for automatically milking said dairy animals.

11. A device for feeding animals, particularly dairy animals such as dairy cows, which is displaceful as an unit from its location and comprises apparatus for milking said animals automatically, a closet structure and associated cleaning means for flushing said closet structure, and an electronic sensor means that senses whether or note the animal therein ash deposited its droppings.

12. A device for maintaining animals in a clean condition, particularly dairy animals such as dairy cows, comprising a system which includes electronic means comprising conducting means for conducting the animal to a desired place for depositing its droppings, said electronic means comprising a system which controls feeding means to supply food to the animal after the animal has deposited its droppings at said desired place.

13. A device as claimed in claim 12, wherein said desired place is a milking parlor.

14. An accommodation such as a building or a pasture, for animals, particularly dairy animals such as dairy cows, whereby near the accommodation a storage place is provided for storing the droppings from said animals at least one movable closet type device being arranged between the accommodation and said storage place, said movable closet type device being constructed and arranged to accommodate a single animal, said movable closet type device including an animal waste disposal means which is disposed to receive said droppings when said animal is in said movable closet type device and to remove said droppings to said storage place, the accommodation also being associated with means mounted on said animals for causing the dairy cows to excrete their droppings only while in said movable closet type device.

15. An accommodation as claimed in claim 14, wherein said movable closet type device is constructed and arranged so that a plurality of animals may be received in said movable closet type device one after another.

16. An accommodation as claimed in claim 14, wherein said movable closet type device comprises a gate through which said animals enter said movable closet type device and control means for selectively securing said gate in a closed position.

17. An accommodation as claimed in claim 16, wherein said movable closet type device comprises another gate through which said animals leave said movable closet type device and further control means for selectively locking and unlocking said gate.

18. An accommodation as claimed in claim 14, wherein said movable closet type device includes a feeding system.

19. An accommodation as claimed in claim 14, wherein said animal waste disposal means comprises a grating, a receptacle and a drainage means.

20. An accommodation as claimed in claim 19, wherein said grating comprises a platform of suitable strength and spaced bars to support the weight of said animal, allow the passage of droppings between said spaced bars, and not to trap said animal's hoofs between said spaced bars.

21. An accommodation, such as a building or a pasture, for farm animals, particularly dairy animals such as dairy cows, whereby near the accommodation a storage place is provided for storing droppings from said animals, at least one movable closet type device being arranged between the accommodation and said storage place, said movable closet type device being constructed and arranged to accommodate a single said farm animal, said movable closet type device including an animal waste disposal means which is disposed to receive said droppings when said animal is in said movable closet type device, said waste disposal means having grating means that supports said animal when in the accommodation and has openings through which said droppings can be flushed, said movable closet type device further including a washing means for cleansing the teats of said animal and flushing the droppings of said farm animal into said waste disposal means, said washing means directed at an downward inclination which is at a suitable angle to spray directly on said animal's teats to wash same and aimed at said grating means to flush said animal's droppings therefrom into said waste disposal means for removal to said storage place.

22. An accommodation as claimed in claim 21, wherein said washing means is adapted to clean both said animal's udder and said grating means.

23. A milking parlor for milking dairy animals such as dairy cows which comprises milking equipment and animal waste receiving and disposal means, said milking parlor being displacable as a unit and comprising a washing device for simultaneously cleaning at least part of an animal therein and removing said animal's droppings from the vicinity of said animal and into said animal waste receiving and disposal means, said washing device directing cleaning fluid simultaneously towards said animal's teats and towards said animal's droppings to wash said droppings into said animal waste receiving and disposal means.

24. A milking parlor as claimed in claim 23, comprising means for encouraging said animal to deposit its droppings in said animal waste receiving and disposal means.

25. A feeding station which is constructed and arranged to feed several dairy animals such as dairy cows in sequence one after the other and which comprises a movable closet type device that includes a waste disposal means for receiving and removing the animals' droppings form the feeding station, and means mounted on each said animal for inducing each of said animals to enter said movable closet type device for excreting its droppings.

26. A device for feeding animals, particularly dairy animals such as dairy cows, which is displacable as a unit form its location and comprises a waste disposal means for receiving and removing form the vicinity of the device droppings form said animals received therein, and apparatus for milking said animals automatically.

27. A device as claimed in claim 26, comprising a closet structure and associated cleaning means for simultaneously flushing said closet structure and cleaning the teats of said animals.

28. A device for maintaining animals in a clean condition, particularly diary animals such as dairy cows, comprising a movable milking parlor, a movable electronic system means for conducting or attracting said dairy animal to said movable milking parlor, said movable milking parlor being constructed to include waste disposal means to receive and remove from the vicinity of said milking parlor the dropping of said dairy animal.

29. A device as claimed in claim 28, wherein said movable electronic system means comprises a receiving means mounted on said movable milking parlor and a transmitting means mounted on the tail of said dairy animal.

30. A device as claimed in claim 28, wherein transmitting means is mounted on the tail of said dairy animal comprises an attraction means and a switching means controlled by a signal from said movable milking parlor, said switching means possessing a threshold value adjusted so as not to be activated until in the imminent area of said transmitting means, said imminent area being substantially defined by the limits of said movable milking parlor.

31. A device as claimed in claim 30, wherein said switching means controls said attraction means included in said movable electronic system means for attracting said dairy animal to said milking parlor, said attracting means being disabled by said switching means upon entry into said imminent area of said transmitting device.

32. A device as claimed in claim 31, wherein said switching means comprises an AND-gate which causes the interruption of said attracting means when the animal has entered said imminent area.

33. A device as claimed in claim 28, comprising water flushing means for simultaneously cleaning the udder of said animal and said animal waste disposal means.

* * * * *